United States Patent
Yasuda et al.

(10) Patent No.: US 10,604,042 B2
(45) Date of Patent: Mar. 31, 2020

(54) VEHICLE REAR SEAT FRAME AND VEHICLE

(71) Applicant: Mitsubishi Jidosha Kogyo Kabushiki Kaisha, Tokyo (JP)

(72) Inventors: Shintaro Yasuda, Tokyo (JP); Kenji Hayashi, Tokyo (JP); Mafuyu Okada, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 59 days.

(21) Appl. No.: 15/832,132

(22) Filed: Dec. 5, 2017

(65) Prior Publication Data
US 2018/0162247 A1 Jun. 14, 2018

(30) Foreign Application Priority Data
Dec. 9, 2016 (JP) .................. 2016-239034

(51) Int. Cl.
*B60N 2/68* (2006.01)
*B60N 2/42* (2006.01)
(Continued)

(52) U.S. Cl.
CPC .............. *B60N 2/68* (2013.01); *B60N 2/22* (2013.01); *B60N 2/305* (2013.01); *B60N 2/3013* (2013.01);
(Continued)

(58) Field of Classification Search
CPC ........ B60N 2/68; B60N 2/22; B60N 2/42709; B60N 2/4228; B60N 2/305; B60N 2/3013; B60N 2/427; B60N 2/4221
(Continued)

(56) References Cited

U.S. PATENT DOCUMENTS

| 3,544,164 | A | * | 12/1970 | Ohta | .................. A47C 5/04 |
| | | | | | 297/452.2 |
| 5,499,863 | A | * | 3/1996 | Nakane | .................. B60N 2/682 |
| | | | | | 297/452.18 |

(Continued)

FOREIGN PATENT DOCUMENTS

| CN | 1449948 A | 10/2003 |
| CN | 104870246 A | 8/2015 |
| JP | 2003-212017 A | 7/2003 |

OTHER PUBLICATIONS

Chinese Office Action and Search Report for Chinese Application No. 2017112957099, dated Oct. 9, 2019, with an English translation.

*Primary Examiner* — Cassandra Davis
(74) *Attorney, Agent, or Firm* — Birch, Stewart, Kolasch & Birch, LLP

(57) ABSTRACT

An object is to provide a vehicle rear seat frame wherein impact caused by a housed seat toward the vehicle front is mitigated in a case of rear-end collision. Seat cushion side frames are disposed on both ends, with respect to the vehicle lateral direction, of a seat cushion frame, and include first weak portions having less strength than other portions in the vehicle longitudinal direction in a folded state. Seat back side frames disposed on both ends, with respect to the vehicle lateral direction, of a seat back frame include second weak portions having less strength than other portions in the vehicle longitudinal direction in a folded state.

14 Claims, 8 Drawing Sheets

(51) Int. Cl.
*B60N 2/30* (2006.01)
*B60N 2/427* (2006.01)
*B60N 2/22* (2006.01)

(52) U.S. Cl.
CPC ....... *B60N 2/4228* (2013.01); *B60N 2/42709* (2013.01)

(58) Field of Classification Search
USPC .............. 297/216.1, 216.13, 216.14, 216.15, 297/216.16, 452.18
See application file for complete search history.

(56) References Cited

U.S. PATENT DOCUMENTS

| | | | | |
|---|---|---|---|---|
| 6,176,543 | B1 * | 1/2001 | Nawata | B60N 2/1615 296/187.11 |
| 6,988,768 | B2 | 1/2006 | Kutomi et al. | |
| 7,360,832 | B2 * | 4/2008 | Yokota | B60N 2/4228 297/216.1 |
| 8,833,850 | B2 * | 9/2014 | Suzuki | B60N 2/4235 297/216.1 |
| 9,630,539 | B2 | 4/2017 | Yokoyama et al. | |
| 2003/0075951 | A1 * | 4/2003 | Hanakawa | B62D 21/152 296/187.12 |
| 2003/0094830 | A1 | 5/2003 | Kamida et al. | |
| 2009/0179477 | A1 * | 7/2009 | Yamazaki | B60N 2/4228 297/452.18 |

* cited by examiner

VEHICLE REAR SEAT FRAME AND VEHICLE

TECHNICAL FIELD

The present disclosure relates to a vehicle rear seat frame and a vehicle including the rear seat frame.

BACKGROUND

Patent Document 1 (JP2003-212017A) discloses a structure for housing a rear seat of a vehicle. In this structure, a recessed section is formed at the rear position of the rear seat on a rear floor, and the frame of a seat cushion (seat cushion frame) of the rear seat is supported by a shaft disposed in the rear section of the seat cushion frame so as to be rotatable toward the vehicle rear side, so that the frame of a seat back (seat back frame) of the rear seat can be folded toward the seat cushion via a hinge portion. The rear seat can be housed in the recessed section by folding the seat back and rotating the seat cushion.

SUMMARY

In electric cars and hybrid cars, high-voltage parts such as driving batteries and inverters may be situated inside the recessed section on the rear floor. In a case where such a vehicle is provided with the above described foldable rear seat, the housed rear seat is positioned behind the high-voltage parts.

In such a structure, if a rear-end collision occurs while the rear seat is housed, impact may be transmitted to the high-voltage parts via the rear seat, and may cause damage to the high-voltage parts.

In view of the above described technical problem, an object of at least one embodiment of the present invention is to provide a vehicle rear seat frame wherein impact caused by the housed seat toward the vehicle front side can be mitigated in a rear-end collision.

A vehicle rear seat frame for a rear seat disposed in a rear section of a vehicle according to at least one embodiment of the present invention includes a seat cushion frame and a seat back frame being foldable about an axis along a lateral direction of the vehicle so as to be overlapped with each other. The seat cushion frame includes a seat cushion side frame at each lateral end of the seat cushion frame. The seat cushion side frame extends in a longitudinal direction of the vehicle when folded. The seat back frame includes a seat back side frame at each lateral end of the seat back frame. The seat back side frame extends in the longitudinal direction when folded. The seat cushion side frame includes a first weak portion having less longitudinal strength than other portions thereof. The seat back side frame includes a second weak portion having less longitudinal strength than other portions.

With the above configuration, it is possible to mitigate impact caused by a housed seat toward the vehicle front side.

DETAILED DESCRIPTION

Figure 1:
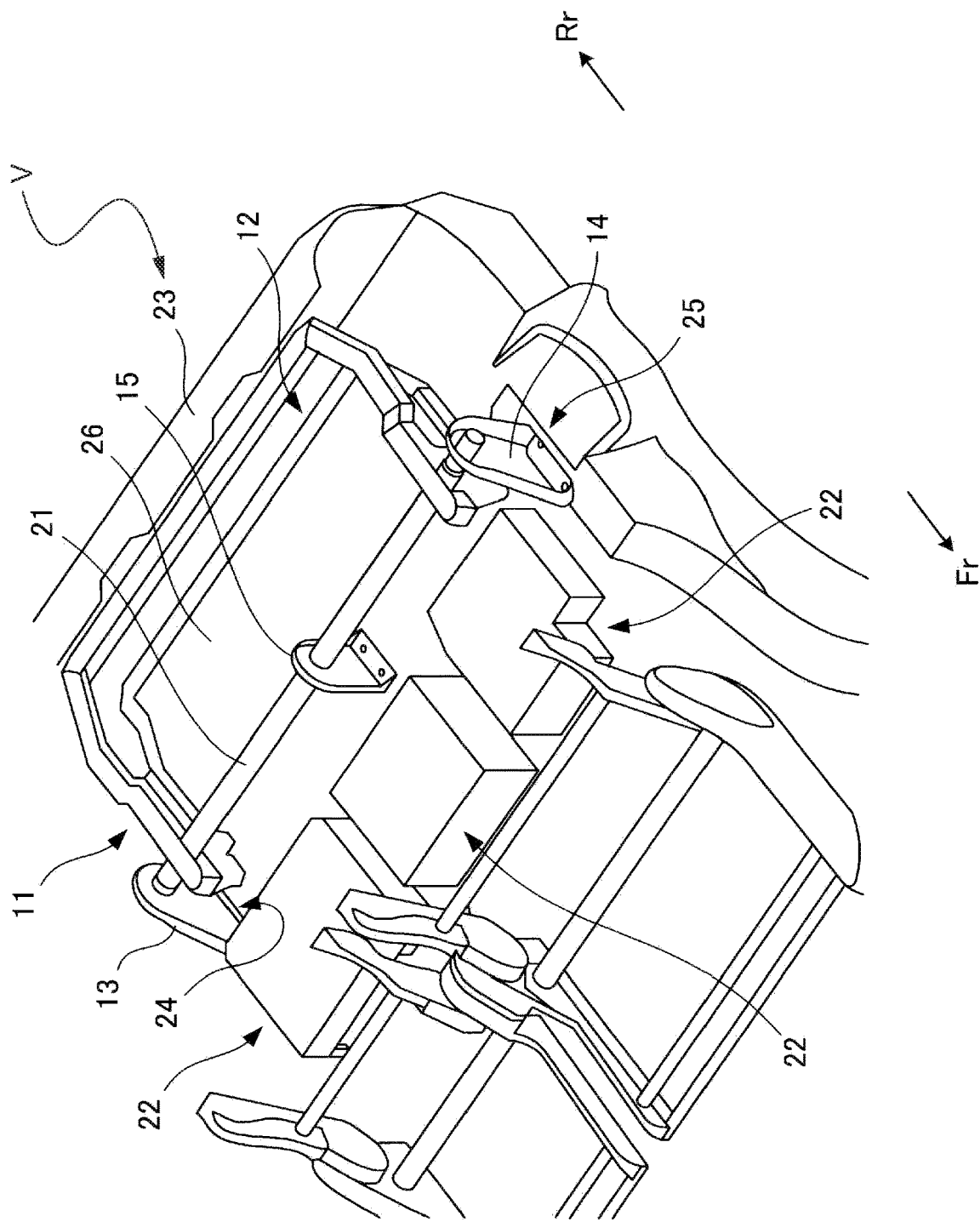
FIG. 1 is a schematic perspective view for describing the positional relationship, on a rear floor, between a vehicle rear seat frame according to Example 1 of the present invention and high-voltage parts.

Hereinafter, an example of a vehicle rear seat frame according to the present invention will be described with reference to drawings. In the drawings, "Fr" refers to the vehicle front side, and "Rr" refers to the vehicle rear side.

Example 1

Figure 2:
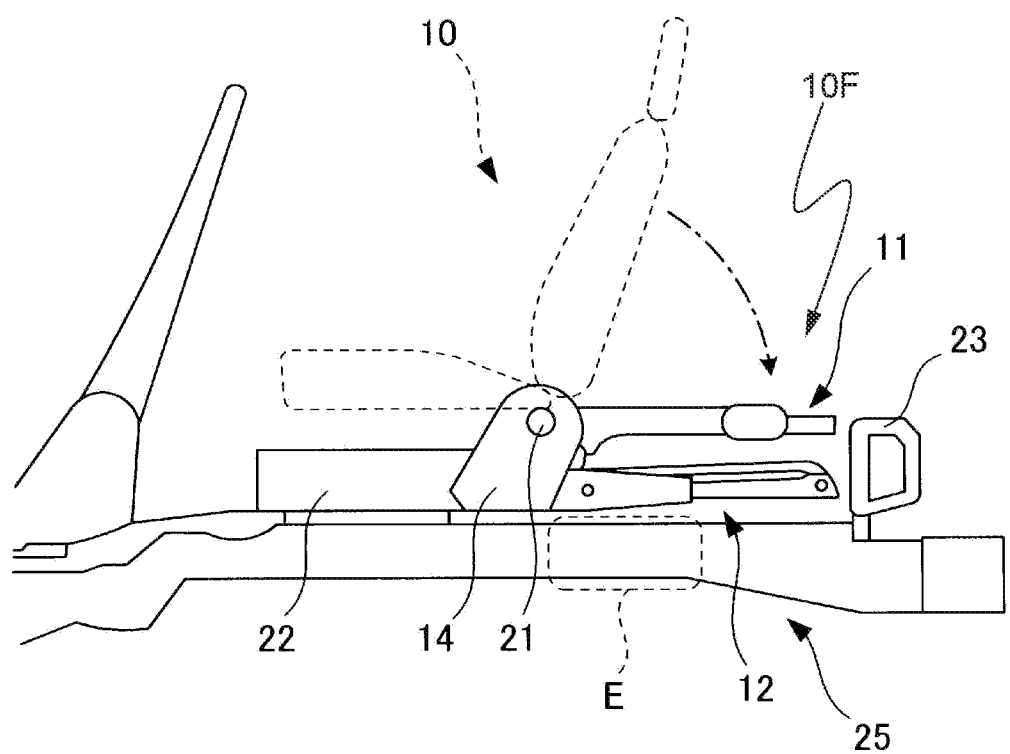
FIG. 2 is a schematic side view for describing the positional relationship, on a rear floor, between a vehicle rear seat frame according to Example 1 of the present invention and high-voltage parts.

FIG. 1 is a schematic perspective view for describing the positional relationship on a rear floor between a vehicle rear seat frame according to the present example and high-voltage parts, and FIG. 2 is a side view of the same. FIGS. 1 and 2 both show the vehicle rear seat frame according to the present example in a housed state (i.e. folded and rotated state).

The vehicle rear seat frame according to the present example is used as, for instance, an interior structure of a rear seat 10 disposed in the rear section of a vehicle V. The rear seat 10 is a foldable seat consisting of a rotatable seat cushion and a rotatable seat back. The rear seat 10 includes a vehicle rear seat frame 10F that includes a seat cushion frame 11 and a seat back frame 12, as shown in FIGS. 1 and 2.

The seat cushion frame 11 is supported by a shaft 21 that extends in the lateral direction (transverse or vehicle width direction) in the rear section of the seat cushion frame 11, so as to be rotatable about the shaft 21 and toward the vehicle rear side. The seat back frame 12 is also supported by the shaft 21 and is foldable toward the seat cushion frame 11, i.e., the seat back frame 12 is also rotatable about the shaft 21 so that it can be rotated forward and folded on top of the seat cushion frame 11.

The seat cushion frame 11 and the seat back frame 12 can be housed by rotating the seat cushion frame 11 and the seat back frame 12 together toward the vehicle rear side (clockwise in FIG. 2) while the seat back frame 12 is folded toward the seat cushion frame 11. The seat cushion frame 11 and the seat back frame 12 are rotated until they become substantially horizontal so that they are overlapped with each other with the seat cushion frame 11 lying above the seat back frame 12. In FIG. 2, the normal position of the rear seat 10 is shown in dashed lines, and rotation of the rear seat 10 toward the vehicle rear side is indicated by a chain-line arrow.

Furthermore, as shown in FIGS. 1 and 2, the vehicle is provided with high-voltage parts 22 such as a driving battery or an inverter. The seat cushion frame 11 and the seat back frame 12 are positioned above the high-voltage parts 22 while the seat is in use. Furthermore, while the seat is housed as described above, the seat cushion frame 11 and the seat back frame 12 are positioned at the vehicle rear side of the high-voltage parts 22 and at the vehicle front side of a rear end 23. In the vehicle height direction, the seat cushion frame 11, the seat back frame 12, the high-voltage parts 22, and the rear end 23 are partially or entirely overlapped with each other (positioned at the same height).

Figure 3:
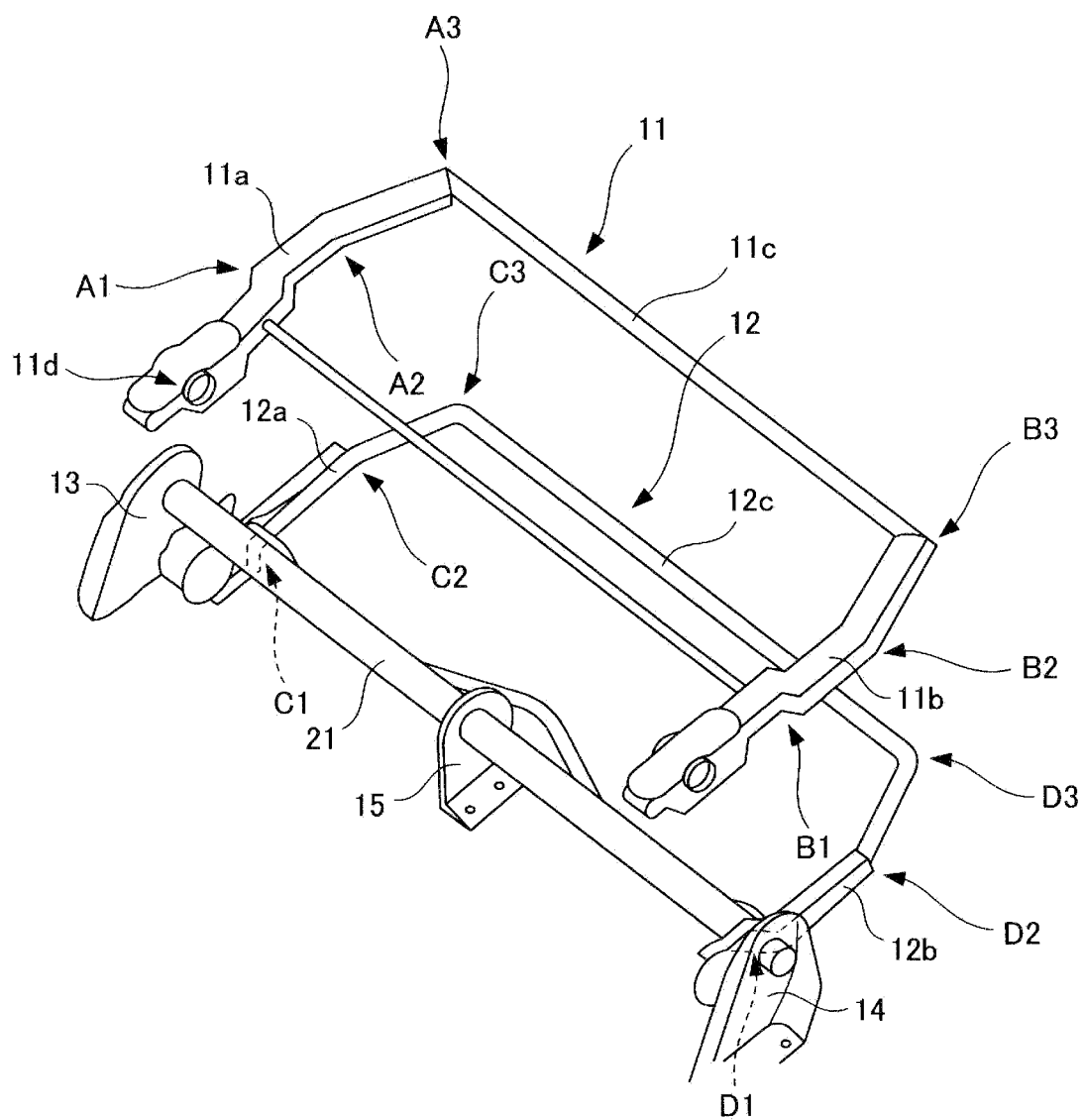
FIG. 3 is an enlarged exploded perspective view of the vehicle rear seat frame according to Example 1 of the present invention.

Furthermore, at both ends of the seat cushion frame 11 with respect to the vehicle width direction, seat cushion side frames 11a, 11b that extend in the longitudinal direction (front-rear direction) of the vehicle V (in a state where the seat cushion frame 11 and the seat back frame 12 are housed) have respective curved portions A1 to A3, B1 to B3, as shown in the exploded perspective view of FIG. 3.

The curved portions A1 to A3 will now be described in detail. The curved portion A1 (first curved portion) is formed so as to project (or curve) outward in the vehicle width direction, in the vicinity of a through hole 11d of the shaft 21, that is, at a first end (proximal end) of the seat cushion side frame 11a, toward a second end (distal end) of the seat cushion side frame 11a.

Furthermore, the seat cushion frame 11 includes a seat cushion cross frame 11c that extends in the vehicle width direction so as to couple the second end of the seat cushion side frame 11a and the corresponding portion (second end) of the seat cushion side frame 11b, and the curved portion A3 (second curved portion) is the coupling portion between the second end of the seat cushion side frame 11a and the first end of the seat cushion cross frame 11c. That is, the seat cushion frame 11 includes a pair of seat cushion side frames 11a, 11b, and a seat cushion cross frame 11c coupling the distal ends of the seat cushion side frames 11a, 11b.

Furthermore, the curved portion A2 (third curved portion) is formed so as to curve inward in the vehicle width direction, between the curved portion A1 and the curved portion A3, toward the second end of the seat cushion side frame 11a.

The above description of the curved portions A1 to A3 can also be applied to the curved portions B1 to B3 of the seat cushion side frame 11b.

FIG. 3 shows that the seat cushion side frame 11a and the seat cushion side frame 11b have a curved shape that projects outward in the vehicle width direction so that the seat cushion side frame 11a and the seat cushion side frame 11b are foldable outward in the vehicle width direction by receiving a predetermined load in the vehicle front-rear direction.

In other words, the seat cushion side frames 11a, 11b have the curved portions A1 to A3, B1 to B3 formed thereon, respectively, thus having weak portions (first weak portions) that deform so that the length in the vehicle front-rear direction decreases by receiving a predetermined load in the vehicle front-rear direction. The predetermined load can be determined according to the dimensions and the strengths of each frame. The dimensions of the frame of the vehicle (e.g., side members) may also be considered. The shape of the curved portions can be determined according to the predetermined load.

Furthermore, at both ends of the seat back frame 12 in the vehicle width direction, seat back side frames 12a, 12b extending in the vehicle front-rear direction (in a state where the seat cushion frame 11 and the seat back frame 12 are housed) also have respective curved portions C1 to C3, D1 to D3.

The curved portions C1 to C3 will be described in detail. The curved portion C1 (fourth curved portion) is formed so as to curve outward in the vehicle width direction, in the vicinity of an end portion adjacent to the shaft 21, that is, at a first end (proximal end) of the seat back side frame 12a, toward a second end (distal end) of the seat back side frame 12a.

Furthermore, the seat back frame 12 includes a seat back cross frame 12c extending in the vehicle width direction so as to couple the second end of the seat back side frame 12a and the corresponding portion (second end) of the seat back side frame 12b, and the curved portion C3 (fifth curved portion) is the coupling portion between the second end of the seat back side frame 12a and the seat back cross frame 12c. That is, the seat back frame 12 includes a pair of seat back side frames 12a, 12b, and a seat back cross frame 12c coupling the distal ends of the seat back side frames 12a, 12b.

Furthermore, the curved portion C2 (sixth curved portion) is formed so as to curve inward in the vehicle width direction, between the curved portion C1 and the curved portion C3, toward the second end of the seat back side frame 12a.

The above description of the curved portions C1 to C3 can also be applied to the curved portions D1 to D3 of the seat back side frame 12b.

Similarly to the seat cushion frame 11, FIG. 3 shows that the seat back side frame 12a and the seat back side frame 12b have a curved shape that projects outward in the vehicle width direction so that the seat back side frame 12a and the seat back side frame 12b are foldable outward in the vehicle width direction by receiving a predetermined load in the vehicle front-rear direction.

In other words, the seat back side frames 12a, 12b have the curved portions C1 to C3, D1 to D3 formed thereon, respectively, thus having weak portions (second weak portions) that deform so that the length in the vehicle front-rear direction decreases by receiving a predetermined load in the vehicle front-rear direction.

Furthermore, in the vehicle front-rear direction (in a state where the seat cushion frame 11 and the seat back frame 12 are housed), the second weak portions of the seat back frame 12 are formed at the positions overlapping with the first weak portions of the seat cushion frame 11.

Furthermore, in the vehicle front-rear direction (in a state where the seat cushion frame 11 and the seat back frame 12 are housed), the first weak portions and the second weak portions are formed at the positions overlapping with the positions of weak portions E of side members 24, 25 of the vehicle (i.e. third weak portions that deform so that the length in the vehicle front-rear direction decreases by receiving a predetermined load in the vehicle front-rear direction) (see FIG. 2).

Furthermore, while seat cushion frames and seat back frames typically include a center frame that extends in the vehicle front-rear direction at the center position with respect to the vehicle width direction, the seat cushion frame 11 and the seat back frame 12 in the present example do not include such a center frame. In other words, the seat cushion frame 11 and the seat back frame 12 have a substantially rectangular shape (with the above curved portions).

Figure 4A:
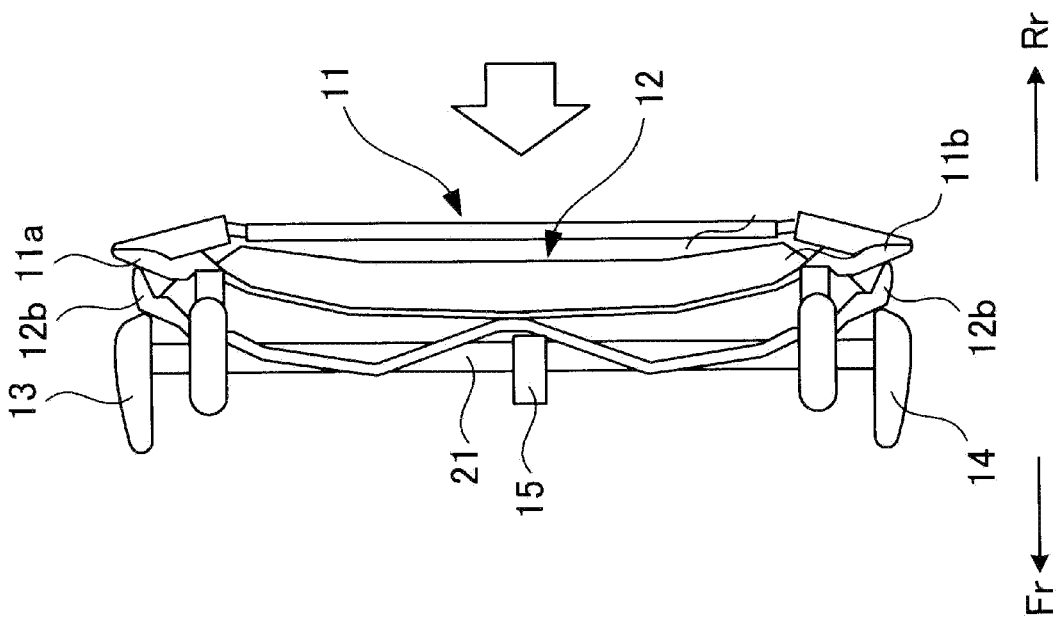
FIGS. 4A and 4B are each a schematic top view for describing deformation, due to a rear-end collision, of the vehicle rear seat frame according to Example 1 of the present invention, showing the frame before and after a rear-end collision, respectively.
Figure 4B:
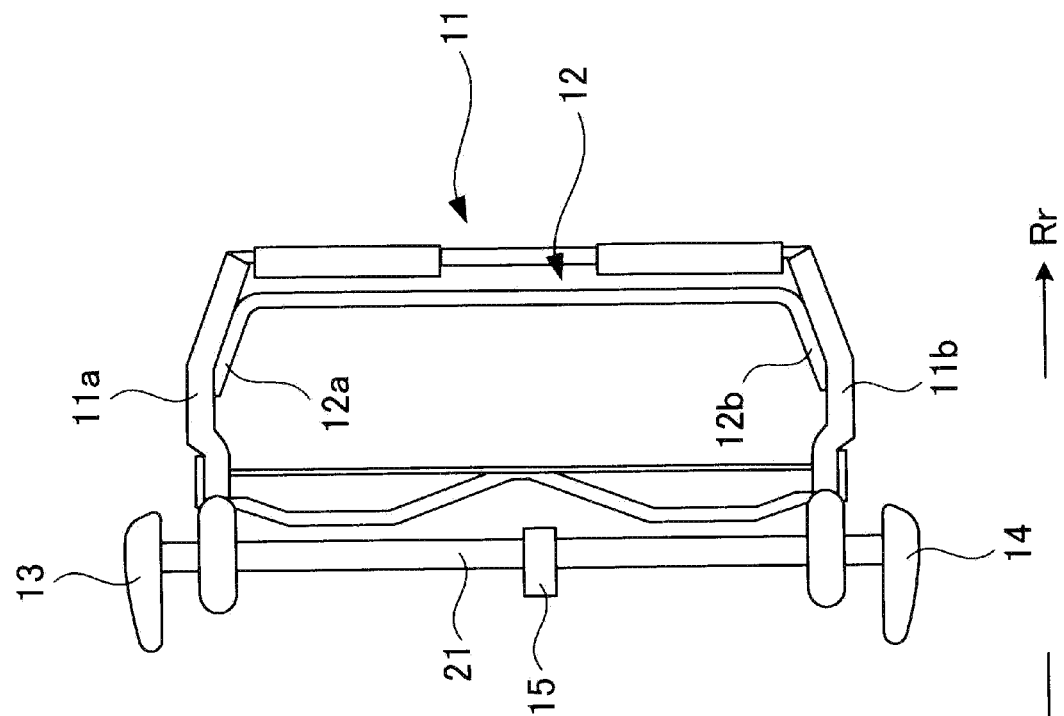

FIGS. 4A and 4B are each a schematic top view for describing deformation due to a rear-end collision of the vehicle rear seat frame according to the present example, showing the frame before and after a rear-end collision, respectively. The hollow arrow in FIG. 4B indicates the direction of transmission of a load from the rear end 23 (see FIGS. 1 and 2) at the time of a rear-end collision.

Figure 5A:
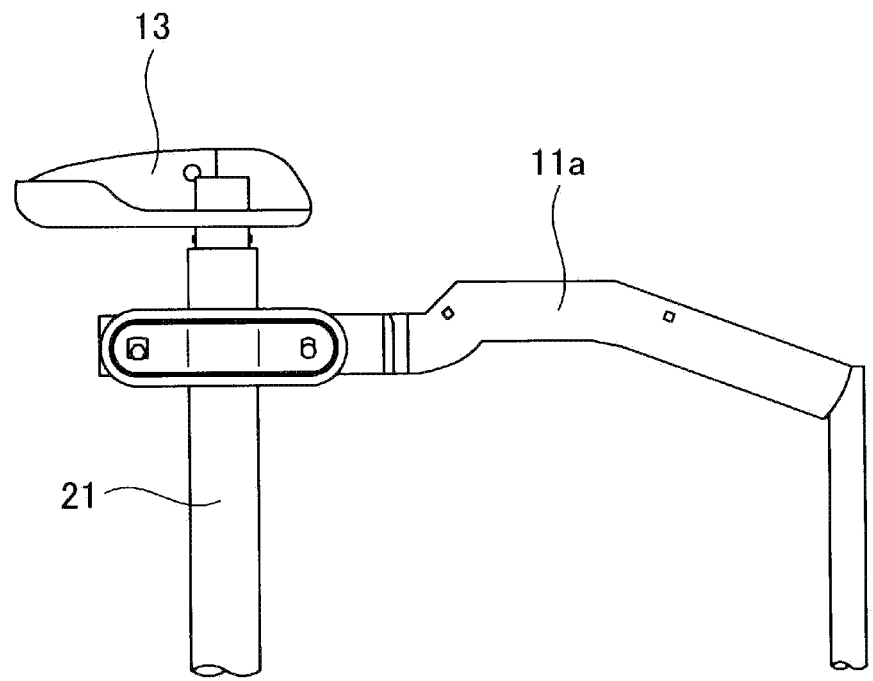
FIGS. 5A and 5B are each a partial enlarged view of the seat cushion side frame in FIGS. 4A and 4B and its peripheral structure, showing the frame before and after a rear-end collision, respectively.
Figure 5B:
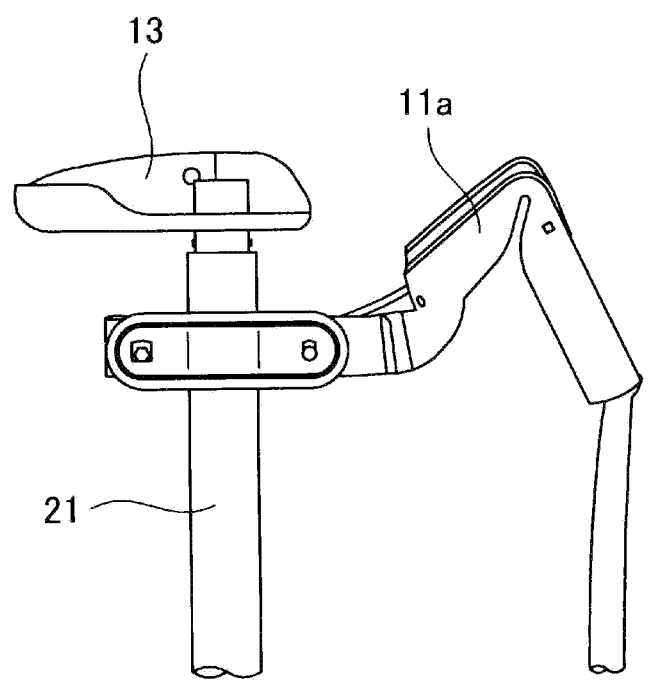
Figure 6A:
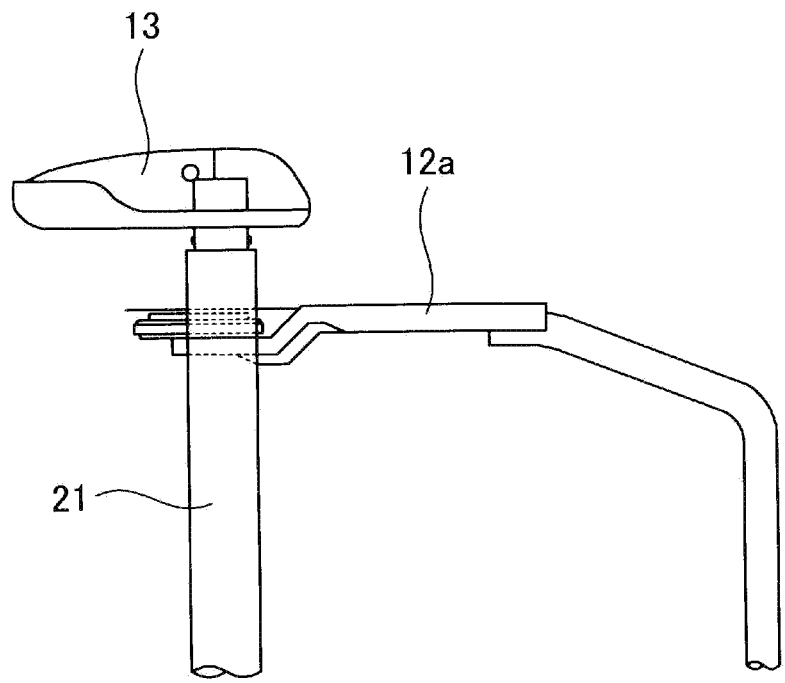
FIGS. 6A and 6B are each a partial enlarged view of the seat back side frame in FIGS. 4A and 4B and its peripheral structure, showing the frame before and after a rear-end collision, respectively.
Figure 6B:
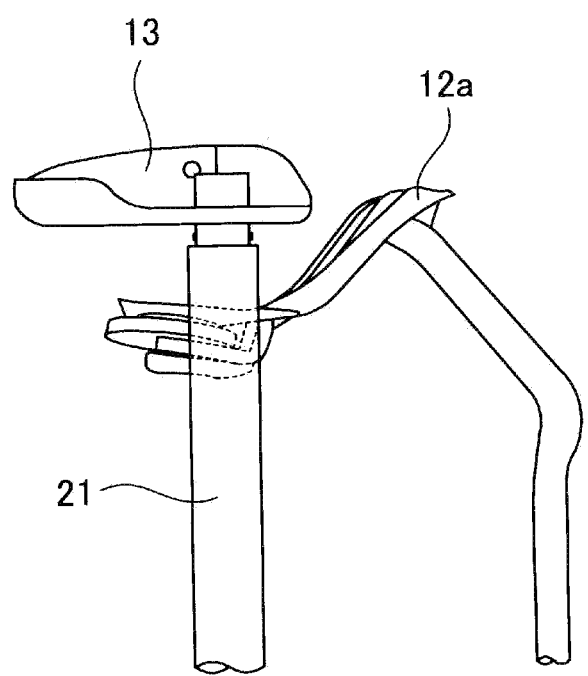

Furthermore, FIGS. 5A and 5B are each a partial enlarged view of the seat cushion side frame 11a in FIGS. 4A and 4B and its peripheral structure, showing the frame before and after a rear-end collision, respectively. Furthermore, FIGS. 6A and 6B are each a partial enlarged view of the seat back side frame 12a in FIGS. 4A and 4B and its peripheral structure, showing the frame before and after a rear-end collision, respectively.

Although not shown in FIGS. 5 and 6, the peripheral structures of the seat cushion side frame 11b and the seat back side frame 12b deform symmetrically with those of the seat cushion side frame 11a and the seat cushion side frame 12a, respectively.

In a rear-end collision, the rear end 23 behind the rear seat is pushed forward, and, in a state where the seat cushion frame 11 and the seat back frame 12 are housed, a load from the rear end 23 (a predetermined load from the vehicle rear side) is transmitted to the seat cushion frame 11 and the seat back frame 12. On such an occasion, as described above, a typical rear seat frames, i.e., a seat cushion side frame and a seat back side frame without weak portions, are not capable of absorbing impact, and may cause damage to the high-voltage parts 22 disposed in front of the frame.

In contrast, with the vehicle rear seat frame according to the present example, as shown in FIGS. 4 to 6, in a rear-end collision, each of the seat cushion side frames 11a, 11b and the seat back side frames 12a, 12b having the weak portions bends outward in the vehicle width direction, thereby reducing the deforming load in the vehicle front-rear direction to reduce a non-collapsed portion, which makes it possible to reduce interference with the high-voltage parts 22 (see FIGS. 1, 2) disposed at the vehicle front side (mitigate impact to the high-voltage parts 22).

Furthermore, with the vehicle rear seat frame according to the present example, the weak portions are realized by the curved shape, so that the frames are bendable in a rear-end collision with a simple frame.

Furthermore, with the vehicle rear seat frame according to the present example, hinge brackets 13, 14 are formed on both ends of the shaft 21 in the vehicle width direction.

The hinge brackets 13, 14 support both ends of the shaft 21, and are fixed to the side members 24, 25, respectively.

Figure 7:
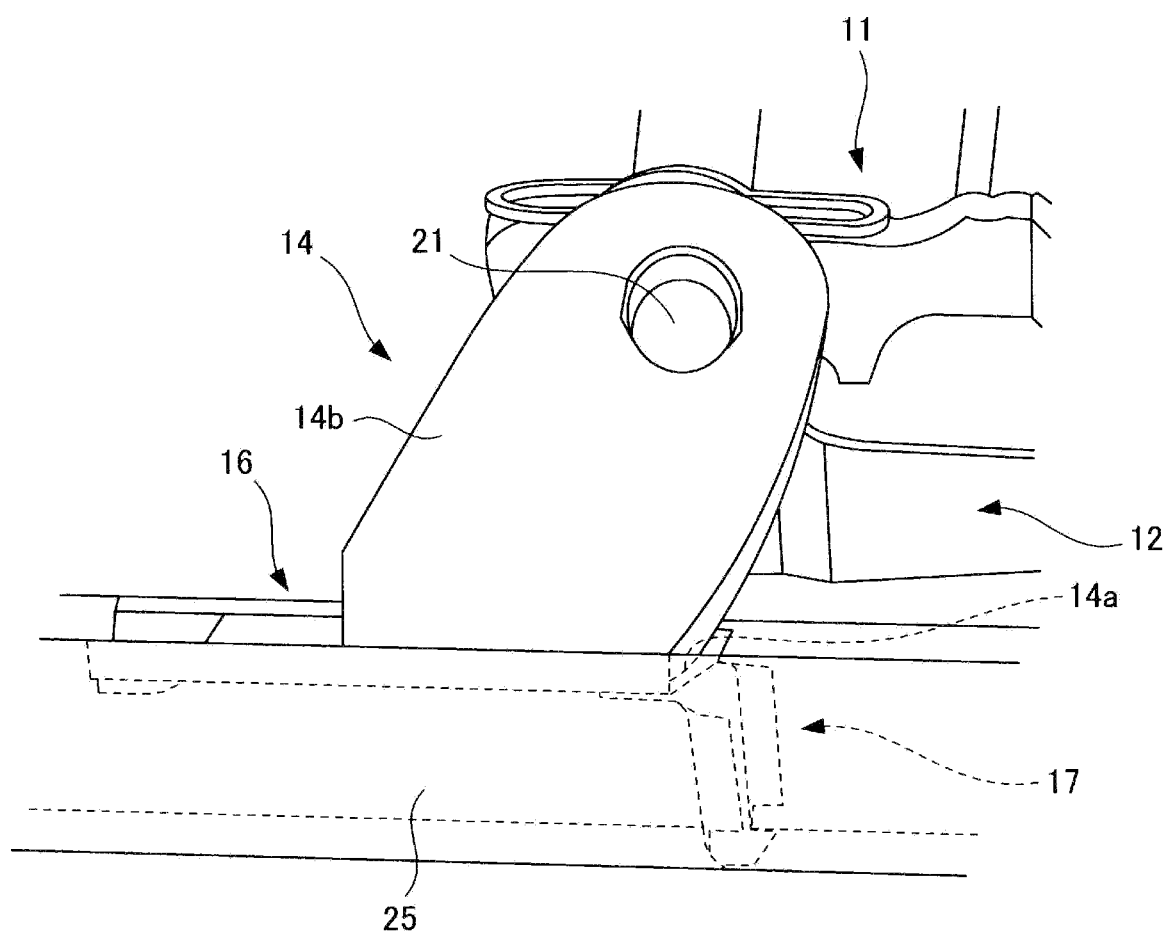
FIG. 7 is an enlarged schematic front view of a hinge bracket and its peripheral structure.
Figure 8:
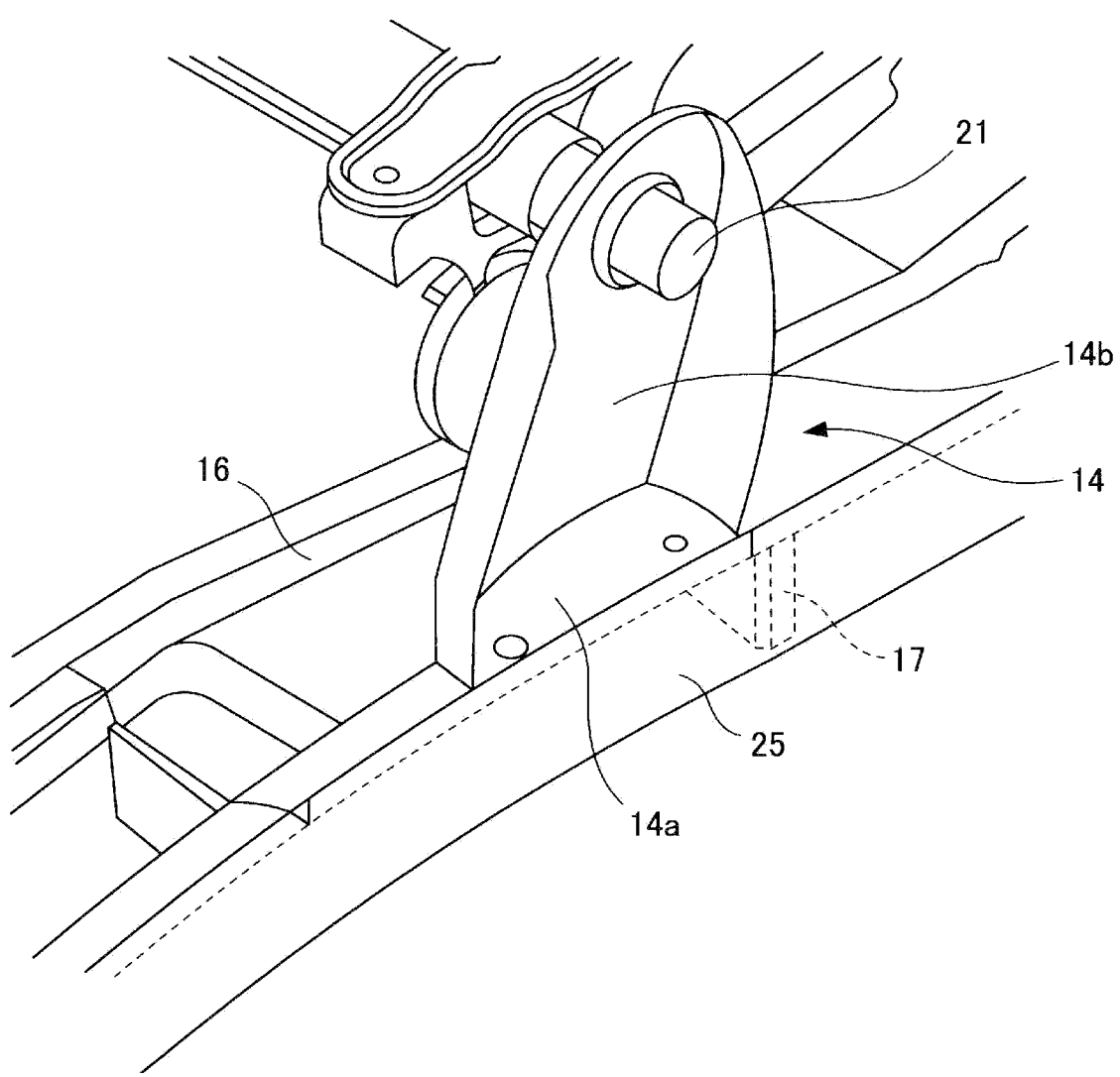
FIG. 8 is an enlarged schematic perspective view of a hinge bracket and its peripheral structure.

Furthermore, as shown in FIGS. 7 and 8, which are enlarged schematic front and perspective views of the hinge bracket 14 and its peripheral structure, in the vehicle rear seat frame according to the present example, a plate 16 to serve as the first reinforcement member and a bulk head 17 to serve as the second reinforcement member are fixed to the inner side of the recessed section of the side member 25 having a substantially U-shape cross section. In FIGS. 7 and 8, the frame inside the side member 25 is shown in dashed lines.

More specifically, the plate 16 is attached at the vehicle front side of the weak portion E of the side member 25 so as to cover (close) the upper side of the recessed section of the side member 25, and extends along a part of the side member 25. The bulk head 17 is formed integrally with the vehicle rear side of the plate 16, and extends toward the bottom side of the recessed section from the plate 16, inside the side member 25. The bulk head 17 couples the plate 16 and the bottom side of the recessed section of the side member 25. The bulk head 17 is positioned at the vehicle front side of the weak portion E of the side member 25.

Furthermore, the hinge bracket 14 has a bottom surface 14a fixed to the side member 25 via the plate 16. That is, the plate 16 couples the side member 25 and the hinge bracket 14. Although not shown, the hinge bracket on the opposite side is fixed similarly to the side member 24.

The hinge bracket 14 is formed and situated so as not to interfere with the side member 25 that deforms in a rear-end collision. That is, specifically, as shown in FIGS. 7 and 8, the hinge bracket 14 has a side surface 14b and the bottom surface 14a, the shaft 21 penetrating through the upper part of the side surface 14b, and the bottom surface 14a being fixed at the vehicle front side of the weak portion E of the side member 25. The plate 16 is disposed between the side member 25 and the hinge bracket 14, at the vehicle front side of the weak portion E of the side member 25.

Although not shown in FIGS. 7 and 8, the above description can also be applied to the side member 24 and the hinge bracket 13.

With the vehicle rear seat frame according to the present example having the above described configuration, the plate 16 and the bulk head 17 restrict movement of the hinge brackets 13, 14 supporting the shaft 21, so that the hinge brackets 13, 14 function as bracing members that promote bending of the seat cushion frame 11 and the seat back frame 12, thus suppressing the movement amount of the seat cushion frame 11 and the seat back frame 12 in a housed state toward the vehicle front side in a rear-end collision, which makes it possible to reduce interference with the high-voltage parts 22.

Furthermore, the vehicle rear seat frame according to the present example includes a center bracket 15 supporting the center part of the shaft 21 with respect to the extending direction of the shaft 21 (the shaft 21 is disposed so as to penetrate through the center bracket 15). The center bracket 15 is fixed to the floor panel 26 of the vehicle of the vehicle V.

Accordingly, with the vehicle rear seat frame according to the present example, it is possible to further suppress the movement amount of the housed seat cushion frame 11 and the seat back frame 12 toward the vehicle front side in a rear-end collision, which makes it possible to reduce interference with the high-voltage parts 22 even further. Furthermore, the reinforcement by the hinge brackets 13, 14 also have an effect to suppress separation of the rear seat 10 from the vehicle body due to breakage of a base member (floor panel 26) caused by movement of the center bracket 15 in a rear-end collision.

It should be noted that, the rear seat 10 having the vehicle rear seat frame according to the present example as its internal frame can be properly used in a normal state (non-housed) state, for the direction of the load applied to the seat cushion frame 11 and the seat back frame 12 when the rear seat 10 is used in a normal (non-housed) state is different from the direction of the load applied to the seat cushion frame 11 and the seat back frame 12 in a rear-end collision described above (i.e. the above described weakening direction).

Furthermore, while the seat cushion frame 11 and the seat back frame 12 are housed by being rotated toward the vehicle rear side in the above description, the seat cushion frame 11 and the seat back frame 12 may be housed by being rotated toward the vehicle front side.

Nevertheless, the high-voltage parts 22 need to be disposed at the vehicle front side of the seat cushion frame 11 and the seat back frame 12 in a housed state. Thus, in a case where the seat cushion frame 11 and the seat back frame 12 are housed by being rotated toward the vehicle front side, the high-voltage parts 22 need to be disposed even closer to the front of the vehicle than in a case where the seat cushion frame 11 and the seat back frame 12 are housed by being rotated toward the vehicle rear side.

Furthermore, while components disposed at the vehicle front side of the seat cushion frame 11 and the seat back frame 12 in a housed state are the high-voltage parts 22, the present example is not limited to this. For instance, the components may be other parts (parts that may a high risk when damaged, such as battery, fuel tank, etc.).

INDUSTRIAL APPLICABILITY

The present disclosure is applicable as a vehicle rear seat frame.

The invention claimed is:

1. A vehicle rear seat frame for a rear seat disposed in a rear section of a vehicle comprising:
 a seat cushion frame and a seat back frame being foldable about an axis along a lateral direction of the vehicle so as to be overlapped with each other,
 wherein the seat cushion frame comprises a seat cushion side frame at each lateral end of the seat cushion frame, the seat cushion side frame extending in a longitudinal direction of the vehicle when folded, and the seat cushion side frame has a first weak portion having less longitudinal strength than other portions thereof, and
 the seat back frame comprises a seat back side frame at each lateral end of the seat back frame, the seat back side frame extending in the longitudinal direction when folded, and the seat back side frame has a second weak portion having less longitudinal strength than other portions thereof,
 wherein the first weak portion and the second weak portion are formed at positions which overlap with each other in a vertical direction when the seat cushion frame and the seat back frame are folded.

2. The vehicle rear seat frame according to claim 1,
 wherein the first weak portion is a portion of the seat cushion side frame having a shape which is configured to bend laterally outward upon receiving a longitudinal load from the vehicle rear, and
 the second weak portion is a portion of the seat back side frame having a shape which is configured to bend laterally outward upon receiving a longitudinal load from the vehicle rear.

3. The vehicle rear seat frame according to claim 2,
 wherein each of the first weak portion and the second weak portion has a curved shape which projects outward in the lateral direction.

4. The vehicle rear seat frame according to claim 2,
 wherein the seat cushion frame further comprises a seat cushion cross frame extending in the lateral direction and coupling respective distal ends of the seat cushion side frames, and
 the seat back frame further comprises a seat back cross frame extending in the lateral direction and coupling respective distal ends of the seat back side frames,
 wherein the first weak portion includes:
  a first curved portion formed on a proximal end side of the seat cushion side frame having a shape curved laterally outward;
  a second curved portion formed at a coupling portion between a lateral end of the seat cushion cross frame and the distal end of the seat cushion side frame; and
  a third curved portion formed between the first curved portion and the second curved portion and having a shape curved laterally inward, and
 wherein the second weak portion includes:
  a fourth curved portion formed on a proximal end of the seat back side frame having a shape curved laterally outward;
  a fifth curved portion formed at a coupling portion between a lateral end of the seat back cross frame and the distal end of the seat back side frame; and
  a sixth curved portion formed between the fourth curved portion and the fifth curved portion having a shape curved laterally inward.

5. A vehicle comprising:
 a pair of side members extending in a longitudinal direction and disposed at both lateral ends of the vehicle; and
 the vehicle rear seat frame according to claim 4,
 wherein the side members include a third weak portion which is configured to deform in the longitudinal direction upon receiving a load in the longitudinal direction, and
 the third curved portion, the sixth curved portion, and the third weak portion are formed at positions which overlap with each other in a vertical direction when the seat cushion frame and the seat back frame are folded.

6. The vehicle according to claim 5, further comprising:
 a shaft extending in the lateral direction and rotatably supporting the seat cushion frame and the seat back frame;
 a hinge bracket fixed at a vehicle front side from the third weak portion of the side member, the hinge bracket supporting an end of the shaft; and
 a first coupling member coupling the side member and the hinge bracket, at the vehicle front side from the third weak portion of the side member.

7. The vehicle according to claim 6, further comprising:
 a center bracket fixed to a floor panel of the vehicle and supporting a laterally center part of the shaft.

8. The vehicle according to claim 6, further comprising:
 a second coupling member provided inside the side member and at a vehicle rear side from the first coupling member, the second coupling member coupling the first coupling member and a bottom surface of the side member.

9. The vehicle according to claim 8, further comprising:
 a center bracket fixed to a floor panel of the vehicle and supporting a laterally center part of the shaft.

10. A vehicle comprising:
 a pair of side members extending in a longitudinal direction and disposed at both lateral ends of the vehicle; and
 the vehicle rear seat frame according to claim 4,
 wherein the side members include a third weak portion which is configured to deform in the longitudinal direction upon receiving a load in the longitudinal direction, and
 the first curved portion, the fourth curved portion, and the third weak portion are formed at positions which overlap with each other in a vertical direction when the seat cushion frame and the seat back frame are folded.

11. The vehicle according to claim 10, further comprising:
 a shaft extending in the lateral direction and rotatably supporting the seat cushion frame and the seat back frame;
 a hinge bracket fixed at a vehicle front side from the third weak portion of the side member, the hinge bracket supporting an end of the shaft; and a first coupling member coupling the side member and the hinge bracket, at the vehicle front side from the third weak portion of the side member.

12. The vehicle according to claim 11, further comprising:
a second coupling member provided inside the side member and at a vehicle rear side from the first coupling member, the second coupling member coupling the first coupling member and a bottom surface of the side member.

13. The vehicle according to claim 12, further comprising:
a center bracket fixed to a floor panel of the vehicle and supporting a laterally center part of the shaft.

14. The vehicle according to claim 11, further comprising:
a center bracket fixed to a floor panel of the vehicle and supporting a laterally center part of the shaft.

* * * * *